United States Patent Office 3,007,924
Patented Nov. 7, 1961

---

3,007,924
EPOXIDES OF 16-ALKYLIDENE ESTRONE AND DERIVATIVES THEREOF
David A. Tyner, Glenview, Ill., assignor to G. D. Searle & Co., Chicago, Ill., a corporation of Delaware
No Drawing. Filed Aug. 16, 1960, Ser. No. 49,816
5 Claims. (Cl. 260—239.55)

The present invention relates to compounds of the formula

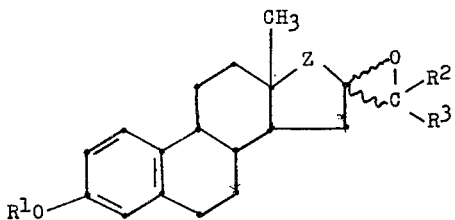

wherein $R^1$ is alkyl, $R^2$ and $R^3$ are hydrogen or alkyl, and Z is carbonyl or (alkyl)carbonyloxymethylene. Among the alkyl radicals designated above, especially lower alkyl radicals are preferred, for example, methyl, ethyl, propyl, isopropyl, butyl, sec-butyl, tert-butyl, pentyl, isopentyl, tert-pentyl, neopentyl, hexyl, isohexyl, heptyl and octyl.

The compounds to which this invention relates possess valuable pharmacological properties. In particular, they exhibit estrogenic, anti-androgenic and lipid-shifting activity.

Manufacture of the subject compounds is accomplished by epoxidation of the corresponding 16-alkylidene steroids of the formula

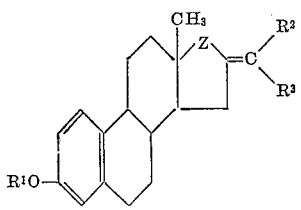

wherein $R^1$, $R^2$, $R^3$ and Z have the meanings heretofore assigned.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

The present application is a continuation-in-part of the copending application Serial No. 632,980, filed January 8, 1957, which issued as U.S. Patent 2,949,476 on August 16, 1960.

*Example 1*

3-methoxy-16-methyl-16,1'-epoxy-1,3,5(10)-estratrien-17-one.—To a stirred solution of 16 parts of 3-methoxy-16-methylene-1,3,5(10)-estratrien-17-one in 250 parts of dioxane, maintained at about 18–25°, is added 60 parts parts of cold 30% hydrogen peroxide followed by a 4 molar solution of sodium hydroxide containing a total of 1.6 parts of sodium hydroxide, added in portions over a period of about 30 minutes. An additional quantity of 50 parts of 30% hydrogen peroxide is added in several portions during the next 5 hours. After 15 hours the mixture is chilled, and then diluted with 1,200 parts of cold water. When separation of the reaction product is complete, the precipitated solid is collected on a filter and thoroughly washed with water. By crystallizations from mixtures of dichloromethane and ethanol there is obtained 3-methoxy-16β-methyl-16α,1'-epoxy-1,3,5(10)-estratrien-17-one, melting at 169–173°. The solvent is evaporated from the mother liquors, and the residue is subjected to chromatography on silica. Elution with 2% ethyl acetate, 98% benzene provides 3-methoxy-16α-methyl-16β,1'-epoxy-1,3,5(10)-estratrien-17-one, melting at about 142–143°.

*Example 2*

3-ethoxy-16-methyl-16,1'-epoxy-1,3,5(10)-estratrien-17-one.—Substitution of 16 parts of 3-ethoxy-16-methylene-1,3,5(10)-estratrien-17-one for the 3-methoxy-16-methylene-1,3,5,(10)-estratrien-17-one of Example 1 gives, by the procedure therein detailed, 3-ethoxy-16-methyl-16,1'-epoxy-1,3,5(10)-estratrien-17-one.

*Example 3*

3-methoxy-16-isopropyl-16,1'-epoxy-1,3,5(10)-estratrien-17-one.—A mixture of 10 parts of estrone 3-methyl ether, 10 parts of potassium hydroxide, 100 parts of ethyl alcohol and 50 parts of acetone is heated under reflux in a nitrogen atmosphere for about 2 hours. At the end of this time, 100 parts of ice water is added, and the resultant mixture is cooled. The precipitate which forms is removed by filtration and recrystallized from ethanol-dichloromethane to give 3-methoxy-16-isopropylidene-1,3,5(10)-estratrien-17-one, melting at about 156–157°. A solution of 10 parts of 3-methoxy-16-isopropylidene-1,3,5(10)-estratrien-17-one in 60 parts of benzene which is 0.62 molar with respect to perbenzoic acid is allowed to stand at 5° for about 48 hours. At the end of this time the reaction mixture is extracted with dilute sodium hydroxide and then with water. The organic layer is evaporated to dryness and the residue is recrystallized twice from methyl alcohol to give a mixture of 3-methoxy-16α-isopropyl-16β,1'-epoxy-1,3,5(10)-estratrien-17-one and 3-methoxy-16β-isopropyl-16α,1'-epoxy-1,3,5(10)-estratrien-17-one, melting at 127–130°. Separation is effected by the method of Example 1.

*Example 4*

3-ethoxy-16-isopropyl-16,1'-epoxy-1,3,5(10)-estratrien-17-one.—Substitution of 10 parts of estrone-3-ethyl ether for the estrone-3-methyl ether of Example 3 gives, by the procedure therein detailed, 3-ethoxy-16-isopropyl-16,1'-epoxy-1,3,5(10)-estrotrien-17-one.

*Example 5*

3-methoxy-16-(diethylmethyl)-16,1'-epoxy-1,3,5(10)-estratrien-17-one.—Substitution of 60 parts of diethyl ketone for the acetone of Example 3 gives, by the procedure therein detailed, 3-methoxy-16-(diethylmethyl)-16,1'-epoxy-1,3,5(10)-estratrien-17-one.

*Example 6*

3-ethoxy-16-(diethylmethyl)-16,1'-epoxy-1,3,5(10)-estratrien-17-one.—Substitution of 10 parts of estrone-3-ethyl ether for the estrone-3-methyl ether and 60 parts of diethyl ketone for the acetone of Example 3 gives, by the procedure therein detailed, 3-methoxy-16-(diethylmethyl)-16,1'-epoxy-1,3,5(10)-estratrien-17-one.

*Example 7*

3-methoxy-16(ethylmethylmethyl)-16,1'-epoxy-1,3,5(10)-estratrien-17-one.—Substitution of 60 parts of methyl ethyl ketone for the acetone of Example 3 gives, by the procedure therein detailed, 3-methoxy-16-(ethylmethylmethyl)-16,1'-epoxy-1,3,5(10)-estratrien-17-one.

Example 8

*3-methoxy-17β-acetoxy-16-methyl - 16,1' - epoxy - 1,3,5(10)-estratriene.*—To a solution of 5 parts of 3-methoxy-16-methylene-1,3,5(10)-estratrien-17-one in 50 parts of isopropyl alcohol at 70° is added a solution of 1 part of sodium borohydride in 10 parts of water, and the resultant mixture is allowed to stand for about ½ hour. Water is added, and the mixture thus obtained is cooled. The precipitate which forms is removed by filtration to give 3 - methoxy - 16-methylene-1,3,5(10)-estratrien-17β-ol, melting at 95–111°. This product is dissolved in 15 parts of pyridine and 15 parts of acetic anhydride, and the resultant mixture is allowed to stand overnight at room temperatures. At the end of this time a large volume of ice water is added and the precipitate which forms is removed by filtration to give 3-methoxy-17β-acetoxy-16-methylene-1,3,5(10)-estratriene, melting at about 128–129°. A mixture of 10 parts of 3-methoxy-17β-acetoxy-16-methylene-1,3,5(10)-estratriene and 60 parts of benzene which is 0.62 molar with respect to perbenzoic acid is kept at 5° for about 48 hours, and then extracted successively with dilute sodium hydroxide and cold water. The organic layer is evaporated to dryness, and the residue is recrystallized from ethyl alcohol to give a mixture of 3-methoxy-17β-acetoxy-16α-methyl-16β,1'-epoxy-1,3,5(10)-estratriene and 3-methoxy - 17β-acetoxy-16β-methyl-16α,1'epoxy - 1,3,5(10) - estratriene, melting at 138–142°. The mixture is separated by the method of Example 1.

Example 9

*3-ethoxy-17β-propionoxy-16-methyl-16,1' - epoxy - 1,3,5(10)-estratriene.*—Substitution of 5 parts of 3-ethoxy-16-methylene-1,3,5(10)-estratrien-17-one for the 3 methoxy-16-methylene-1,3,5(10)-estratrien-17-one and 17 parts of propionic anhydride for the acetic anhydride of Example 8 gives, by the procedure therein detailed, 3-ethoxy-17β-propionoxy-16-methyl-16,1'-epoxy - 1,3,5(10) estratriene.

I claim:
1. A compound of the formula

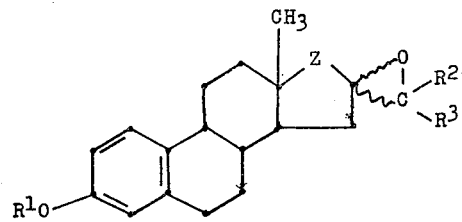

wherein $R^1$ is lower alkyl, $R^2$ and $R^3$ are members of the class consisting of hydrogen and lower alkyl, and Z is a member of the class consisting of carbonyl and (lower alkyl) carbonyloxy methylene.

2. 3-methoxy-16β-methyl - 16α,1' - epoxy - 1,3,5(10)-estratrien-17-one.

3. 3-methoxy-16α-methyl - 16β,1' - epoxy - 1,3,5(10)-estratrien-17-one.

4. 3-methoxy-16-isopropyl - 16,1' - epoxy - 1,3,5(10)-estratrien-17-one.

5. 3-methoxy-17β-acetoxy-16β-methyl - 16α,1' - epoxy-1,3,5(10)-estratrien.

No references cited.